United States Patent [19]
Akkerman

[11] 3,867,904
[45] Feb. 25, 1975

[54] ANIMAL FEEDER

[76] Inventor: James William Akkerman, 1902 Mermaid Ln., Houston, Tex. 77058

[22] Filed: May 9, 1973

[21] Appl. No.: 358,496

[52] U.S. Cl. .............................. 119/51 R, 119/56 A
[51] Int. Cl. ............................................ A01k 05/02
[58] Field of Search .......... 119/51 R, 51 FS, 52 AF, 119/52 B, 51.11, 51.5, 51.13, 56 A, 56 R; 222/54, 55

[56] References Cited
UNITED STATES PATENTS

| 3,033,164 | 5/1962 | Evers | 119/51 R X |
| 3,207,365 | 9/1965 | Burford et al. | 222/54 X |
| 3,276,630 | 10/1966 | Welch | 119/51 R |
| 3,421,479 | 1/1969 | Fleming | 119/51 R X |
| 3,717,125 | 2/1973 | Sanders | 119/51.11 |

FOREIGN PATENTS OR APPLICATIONS

| 1,229,579 | 4/1971 | Great Britain | 119/51.13 |
| 166,538 | 1/1906 | Germany | 119/51.13 |

Primary Examiner—Hugh R. Chamblee
Attorney, Agent, or Firm—Torres & Berryhill

[57] ABSTRACT

An animal feeder comprising: a container for storing animal feed therein; a receiver assembly mounted beneath the container for receiving animal feed dispensed therefrom; a rake assembly engagable with the receiver assembly and movable relative thereto from said receiver; and a thermal motor connected to the rake assembly responsive to changes in ambient temperataure to move the rake assembly relative to the receiver for dispensing animal feed therefrom. The thermal motor may comprise a piston mounted within a cylinder which is in fluid communication with a fluid reservoir. The piston, which may be connected by a rod to the rake assembly, is responsive to the expansion of fluid, due to an increase in ambient temperature, to move the rake assembly. A spring may be mounted in the cylinder for returning the piston means on contraction of the fluid in response to a decrease in the ambient temperature.

9 Claims, 5 Drawing Figures

PATENTED FEB 25 1975

ANIMAL FEEDER

BACKGROUND OF THE INVENTION

1. Field of the Invention

The present invention pertains to animal feeders. More specifically, the present invention pertains to feeders which automatically dispense predetermined amounts of feed to animals.

2. Brief Description of the Prior Art

Many devices have been developed for automatically dispensing feed to various types of animals. Some of these devices have been designed for dispensing feed, primarily, to game animals in anticipation of improved hunting.

Usually areas in which game is plentiful are not supplied by electrical power for automatically controlling the dispensing of feed therefrom. In an effort to overcome the lack of power supply, portable power devices have been designed. Currently popular designs use battery powered or clock spring motors to dispense feed in response to a timer unit. Of course, with such units the energy supply is limited to the size of the battery or clock spring.

The dispensing operation of most animal feeders is normally completed in a short period of time. Thus, one animal may consume the entire quantity of feed dispensed. A single dominant animal will, in many cases, be the only one utilizing the dispenser. Furthermore, the animals may recognize the pattern of the timer of such a unit and anticipate its discharge.

Existing designs are also sensitive to adverse environments, e.g., corrosive conditions and temperature extremes. Many of the existing designs are also relatively expensive. A cheaper feeder would be welcomed.

SUMMARY OF THE INVENTION

The animal feeder of the present invention comprises a container, a receiver assembly, a rake assembly and a thermal motor. The thermal motor utilizes energy transferred from the atmosphere for operation of the feeder. The motor, in response to changes in ambient temperature, causes the rake assembly to dispense feed from the receiver assembly which has previously received feed discharged from the container. The normal temperature differential in a 24-hour period is sufficient to provide the energy necessary to dispense a suitable amount of feed. Furthermore, the feed is continuously dispensed as long as the ambient temperature is changing. The greatest changes occur early in the morning and late in the evening, the most desirable times for game feeding and hunting.

The container simply stores, shelters and protects the feed to be dispensed. It is provided with an outlet at the bottom to allow the contents to discharge onto a small platform or receiver assembly therebelow. As stated, power for moving the rake assembly is provided by the thermal motor. Thermal expansion of oil contained in a reservoir portion of the thermal motor causes a piston attached to the rake assembly to reciprocate within a cylinder.

Thus, the animal feeder of the present invention is powered only by changes in ambient temperature, eliminating the necessity for a battery, clock spring or any other power device. Such an energy supply is of course unlimited and unfailing. The only maintenance necessary is the refilling of the container and maintenance of oil within the reservoir. Thus, the animal feeder of the present invention is not only simple to manufacture and operate, but it is probably the cheapest and most desirable automatic game feeding unit designed to date. Many other objects and advantages of the invention will become evident from a reading of the following description in conjunction with the accompanying drawings.

DESCRIPTION OF A PREFERRED EMBODIMENT

Figure 1:
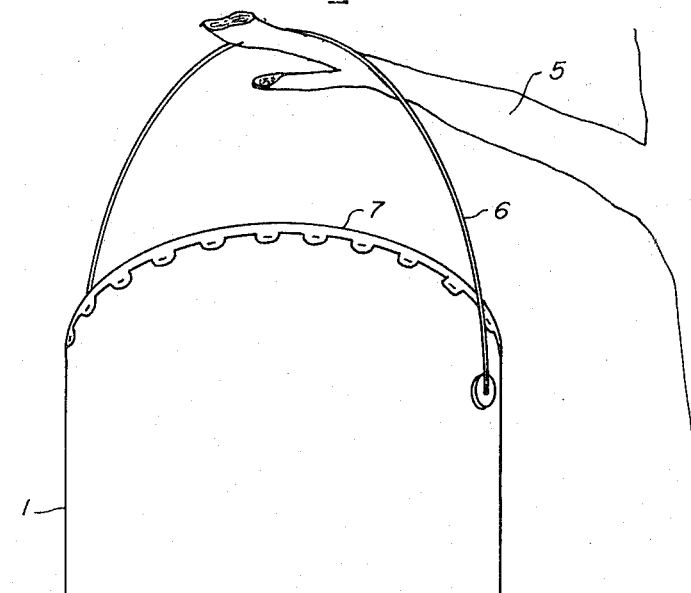
FIG. 1 is an isometric representation of the animal feeder of the present invention deployed, as it might be, by hanging from a tree limb.

Referring first to FIG. 1, the animal feeder of the present invention comprises a container 1, a receiver assembly 2, a rake assembly 3 and a thermal motor 4. All components are structurally connected to form a composite unit and as such may be suspended from a tree limb 5 or any other support by a bail or handle 6. It is best that the unit be out of reach of the animals to be fed thereby.

Figure 4:
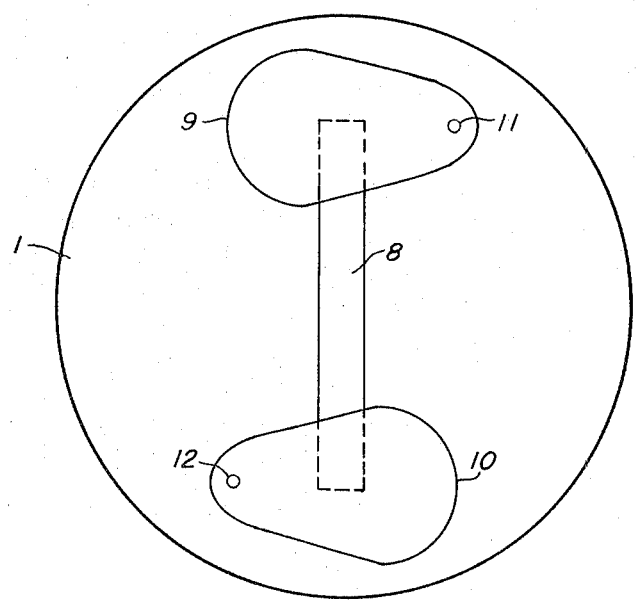
FIG. 4, taken along 4—4 of FIG. 5, is a horizontal cross-section showing the lower portion of the container and means thereon for adjusting the amount of feed discharged therefrom.

The container 1 may conveniently be constructed from an ordinary cylindrical bucket of approximately 5 to 10 gallons volume. A lid or cover 7 may be provided to protect the feed stored therein from the elements. As best seen in FIG. 4, a slot 8 may be cut in the bottom of the container 1 to allow feed to discharge removable gravity onto the receiver assembly 2. Flaps or covers 9 and 10 may be pivotally attached at 11 and 12, respectively, to the bottom of the container 1 allowing the length of the slot 8 to be adjusted for controlling the amount of feed discharged onto the receiver assembly 2.

Figure 3:
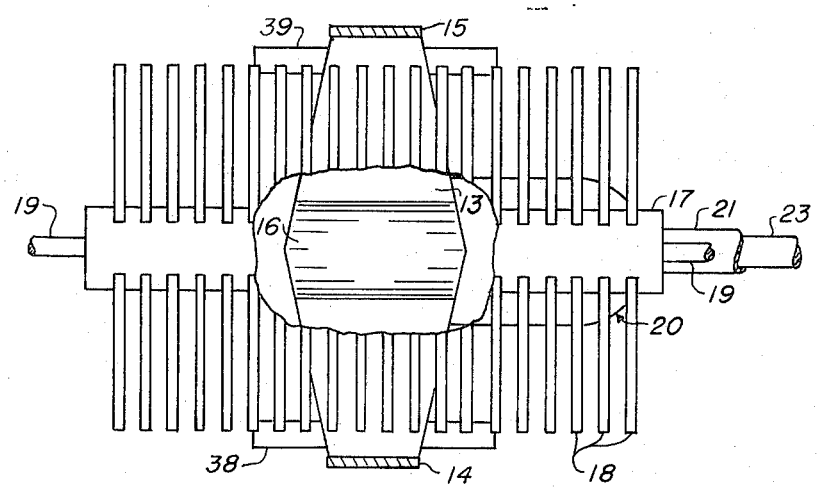
FIG. 3, taken along line 3—3 of FIG. 5, is a horizontal cross-sectional view, in which a portion of the rake assembly has been broken away, showing the rake and receiver assemblies and their relationship with the thermal motor.
Figure 5:
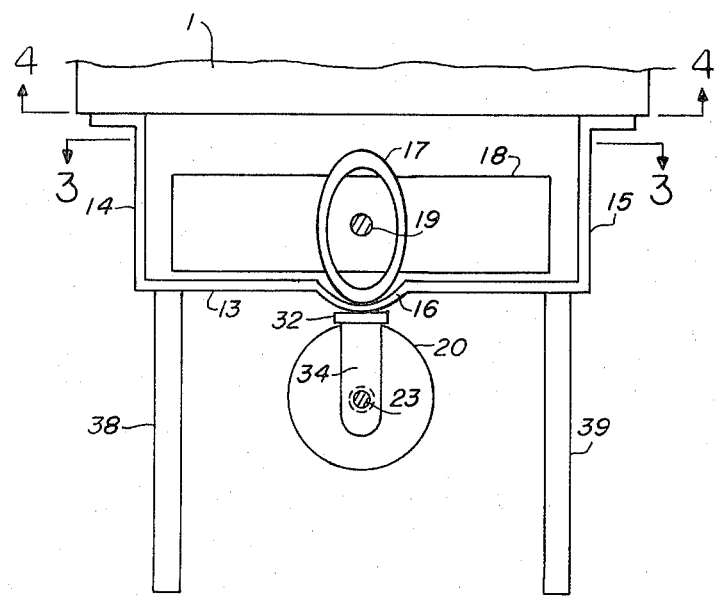
FIG. 5 is an end elevation view of the lower portion of the animal feeder to the present invention, showing in particular the receiver and rake assemblies thereof.

As best seen in FIGS. 3 and 5, the receiver assembly may comprise a horizontal platform or plate 13 attached to the bottom of container 1 by brackets or supports 14 and 15. The width of the platform 13 may be greater near its center than at its ends so that its edges are inclined relative to the movement of the blade assembly 2 as will be more fully understood hereafter. A slight depression 16 may be provided in the center of the platform or plate 13 for slidingly receiving a portion of the rake assembly 3 as will be understood hereafter.

The rake assembly 3 may comprise a central resilient tubular member 17 through axially spaced slots of which are mounted a plurality of blades 18, transverse with the axis of the central member 17. A rod member 19 passes through the central member providing support therefor and connection with the thermal motor 4. By selecting a central member 17 of the proper size the central member will be forced into an eliptical cross section and the force applied to the blades 18 by the member trying to resume its original shape will cause the blades 18 to be maintained therein. The lower portion of the central member 17 is slidingly received within the depression 16 of platform 13. By mounting the blades on a central member the ends of the blades are allowed to flex or give, preventing the rake assembly from hanging on particles of feed.

By applying an axial force to the rod 19 the rake assembly can be reciprocated on platform or plate 13 so as to dispense feed which has been discharged thereon from the container 1. If the rod 19 is reciprocated gradually, the feed is dispensed from the receiver assembly gradually and continuously. By having the edges of the platform 13 inclined relative to the axis of central member 17, feed is gradually dispensed from the receiver assembly by the blades and erratic dumping is avoided. The platform 13 is preferably wide enough to always be underneath at least three spaces of the rake assembly. The depression 16 in the center of the platform provides extra clearance in the vicinity of the central tubular member 17, preventing accumulation of feed from raising the rake assembly and allowing excessive leakage over the edge of the platform.

Figure 2:
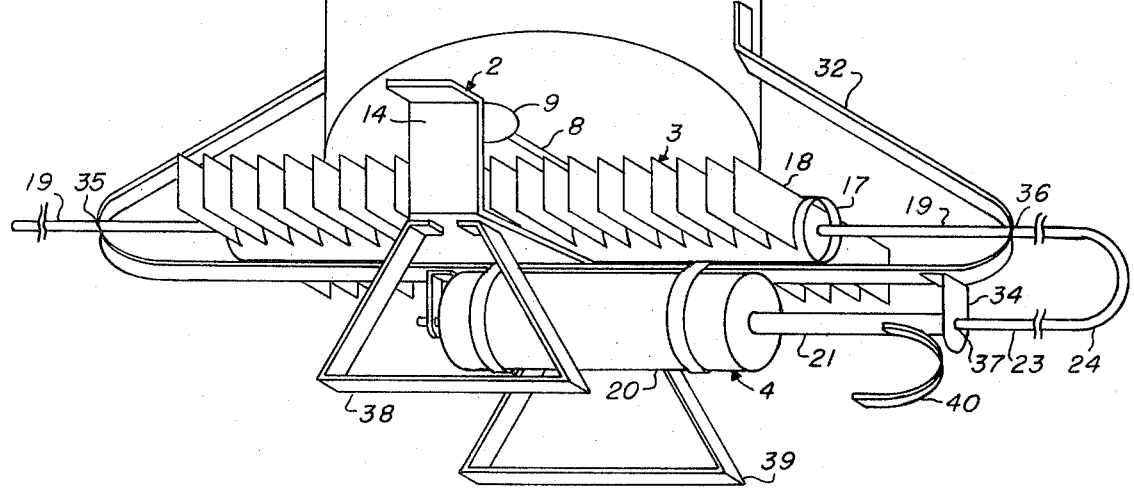
FIG. 2 is a detailed sectional elevation view of the thermal motor of the present invention.
Figure 2:
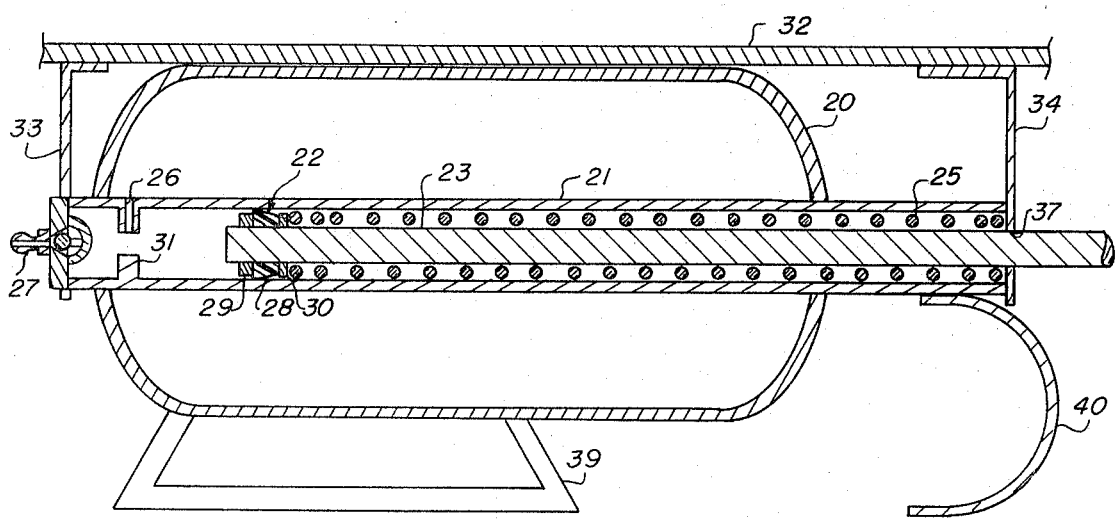

The thermal motor 4, as best seen in FIG. 2 provides the power necessary to reciprocate the rake assembly 3 across the receiver assembly 2. The thermal motor comprises a pressure vessel or reservoir 20, a cylinder 21 centrally disposed therein, a piston 22 disposed within the cylinder 21 for reciprocation therein, a piston rod 23 which is connected by a U-bend 24 (see FIG. 1) to the rake assembly rod 19, and a return spring 25. The piston 22 may comprise a cup type packing seal 28 held in place by seal retainers 29 and 30. The rod 23 extends from the piston through an aperture at the opposite end of the cylinder 21.

The cylinder 21 is in fluid communication with the reservoir 20 through a port 26 and the cylinder 21 is also provided with a valve 27 by which fluid may be introduced into the cylinder and reservoir. Many types of fluid are suitable for use in the thermal motor. Ordinary motor oil has been found to have a desirable coefficient of expansion for operation in ambient temperatures of 0°F to 120°F. One inch of movement of the rake assembly for 10°F. temperature change is typical.

Various structural members may be provided for tying the major components together. The thermal motor 4 may be attached to a support frame 32, which is in turn attached to container 1. Brackets 33 and 34 form part of this attachment. Support frame 32 and bracket 34 are provided with apertures 35, 36 and 37 through which rods 19 and 23 are guided. Support legs 38, 39 and 40 provide support for the entire unit when it is placed on the ground, e.g., during storage or for refilling with feed.

Operation of the animal feeder is as follows. On temperature increases, the fluid in reservoir 20 and cylinder 21 expands causing piston 22 and piston rod 23 to move (to the right as shown in FIG. 2), causing the rake assembly 3 to dispense feed from the receiver assembly 2. As the feed is dispensed, additional feed is discharged onto the receiver assembly 2 from the container 1. As the piston 22 moves to the right (as viewed in FIG. 2) the spring 25 is compressed. On temperature decreases, the fluid in reservoir 2 and cylinder 21 contracts. The compressed return spring 25 then expands causing piston 22 and the attached rake assembly 3 to move in the reverse direction. Feed is also dispensed, from the opposite side of the receiver assembly, during the return or contraction cycle. A stop shoulder 31 is provided within cylinder 21 to prevent the piston 22 from covering port 26.

As can be seen from the foregoing description, the animal feeder of the present invention is extremely efficient, cheap to manufacture and easy to maintain. It's operating power is unlimited and allows deployment in the remotest of locations. No other automatic animal feeder offers the advantages of the present invention.

Although a preferred embodiment of the invention has been described herein, there are other embodiments and applications which are apparent. For example, the thermal motor 4 may be utilized with devices other than animal feeders. It may be used to drive any slowly reciprocating apparatus, i.e., piston pumps or compressors. A specific application would be the pumping of nitrogen into telephone cables for maintaining them in a dry state. Many other variations and applications of the invention may be made by those skilled in the art without departing from the spirit of the invention. It is therefore intended that the scope of the invention be limited only by the claims which follow.

What is claimed is:

1. An animal feeder comprising:
 a. container means for storing animal feed therein;
 b. receiver means mounted beneath said container means for receiving animal feed discharged therefrom;
 c. rake means adjacent said receiver means and movable relative thereto for dispensing animal feed from said receiving means, said rake means comprising a plurality of longitudinally spaced blades mounted transversely to the direction of movement of said rake means; and
 d. drive means connected to said rake means, responsive to changing ambient temperature, to move said rake means relative to said receiver means for said dispensing of animal feed therefrom.

2. An animal feeder as set forth in claim 1 in which said rake means comprises a central tubular member whose axis lies parallel to the direction of movement of said rake means, said blades being mounted through axially spaced slots cut in the sides of said tubular member.

3. An animal feeder as set forth in claim 2 in which said receiver means is provided with a longitudinal depression for slidingly receiving a lower portion of said tubular member.

4. An animal feeder as set forth in claim 1 in which said container means is provvided with adjustable feed means for controlling the rate of discharging animal feed to said receiver means.

5. An animal feeder comprising:
 a. container means for storing animal feed therein;
 b. receiver means mounted beneath said container means for receiving animal feed discharged therefrom;
 c. rake means adjacent said receiver means and movable relative thereto for dispensing animal feed from said receiving means; and
 d. drive means connected to said rake means, responsive to changing ambient temperature, to move said rake means relative to said receiver means for said dispensing of animal feed therefrom; said drive means comprising a thermal motor including: reservoir means filled with a thermally expansible fluid; piston means, one side of which is exposed to said expansible fluid; and rod means connecting said piston means and said rake means; said piston means being responsive to expansion of said fluid, in response to an increase in said ambient temperature, to move said rake means for said dispensing of said animal feed.

6. An animal feeder as set forth in claim 5 in which said thermal motor comprises cylinder means in fluid communication with said reservoir means through port means, said piston means being mounted in said cylinder means for reciprocation therein, and spring means mounted in said cylinder for returning said piston means, on contraction of said fluid, in response to a decrease in said ambient temperature.

7. An animal feeder as set forth in claim 6 in which said cylinder means is mounted within said reservoir means and in one end of which is provided said port means to establish said fluid communication with said reservoir means, said cylinder also being provided with valve means for filling said reservoir means with fluid.

8. An animal feeder as set forth in claim 7 in which said cylinder means is provided with stop means engagable by said piston means on contraction of said fluid to limit said return movement of said piston means.

9. An animal feeder as set forth in claim 6 in which said rod means is centrally disposed within said cylinder means for reciprocation with said piston means, said spring means surrounding said rod means within said cylinder means.

* * * * *